United States Patent Office 2,765,292
Patented Oct. 2, 1956

2,765,292

STABILIZATION OF SYNTHETIC RUBBER-MODI-
FIED POLYSTYRENES WITH HYDROQUINONE
MONOETHERS AND DITHIOCARBAMIC ACID
SALTS

Frazier Groff, Plainfield, and Rogers K. Dearing, West-
field, N. J., assignors to Union Carbide and Carbon
Corporation, a corporation of New York No Drawing. Application April 15, 1953,
Serial No. 349,112

8 Claims. (Cl. 260—45.5)

This invention is concerned with stabilizing plastic compositions comprising polystyrene and a synthetic rubber, such as polybutadiene or styrene-butadiene rubbery copolymers. More particularly, the invention relates to inhibiting changes in color of such composition occurring at elevated temperatures and in the presence of oxygen.

Commercial polystyrenes have found wide acceptance as a thermoplastic molding material due to their reasonable cost and ease of molding. Nevertheless, for many applications polystyrene is lacking in adequate resistance to impact. To overcome this impact deficiency, polystyrene has been modified by the incorporation of minor amounts of a synthetic rubber such as polybutadiene or the rubbery copolymers of styrene and butadiene. Such plastic compositions have been made in various ways as by physically blending a minor amount of rubbery styrene-butadiene copolymers with a major amount of polystyrene; by copolymerizing a major amount of styrene with a small amount of butadiene; by partially polymerizing butadiene and then adding a greater amount of styrene monomer and completing the polymerization; and by interpolymerizing a relatively larger amount of styrene with a smaller amount of a rubbery copolymer of styrene and butadiene. All these blends or mixtures of rubber-modified polystyrene are generally characterized by a higher impact strength and greater elongation than straight polystyrenes. On the other hand, the synthetic rubber-modified polystyrenes due to their rubber content require higher processing temperatures than unmodified polystyrene to mill or otherwise mix in fillers, pigments, lubricants and other conventional molding material components. Furthermore, in the subsequent forming operations, such as molding, extruding or laminating higher temperatures are also required to impart satisfactory fluidity.

At these higher temperatures, and particularly in the presence of atmospheric oxygen, the synthetic butadiene rubber-modified polystyrenes tend to darken in color, the extent of change being dependent upon the temperature, duration of exposure, and contact with oxygen, with most of the change occurring on the exposure surfaces of the material.

In the absence of pigments or other coloring matter, the butadiene rubber-modified polystyrene compositions before exposure to extreme heat and oxygen range in color from colorless to opaque brown masses. Upon heating the unpigmented synthetic rubber-modified polystyrenes in the presence of oxygen, the usual color change is for the composition to pass through stages of yellow, amber, brown and finally black. Pigmented compositions, for example, those containing white pigments, first develop a cream color, and with continued exposure to heat and oxygen turn to tan, and finally dark brown.

It has now been found that substantial resistance to color degradation of synthetic rubber-modified polystyrenes caused by exposure to heat and oxygen can be had by incorporating in such polystyrenes relatively small amounts each of a hydroquinone monoether having the formula:

in which R is a monovalent hydrocarbon group free from olefinic unsaturation, and which can be alkyl, aryl, alkaryl and aralkyl and further of a metal salt of a di-substituted dithiocarbamic acid, said salt having the formula:

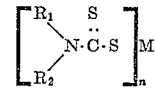

in which $R_1$ and $R_2$ are each a monovalent hydrocarbon group free from olefinic unsaturation and which can be alkyl, aryl, alkaryl and aralkyl, M is a metal, and $n$ is an integer corresponding to the principal valence of the metal, M.

Examples of hydroquinone monoethers useful in the practice of this invention include among others, hydroquinone monobenzyl ether; hydroquinone monotolyl ether; hydroquinone monoethyl ether; hydroquinone mono-n-butyl ether; hydroquinone monooctyl ether; hydroquinone monohexyl ether, and hydroquinone monophenyl ether.

Examples of metal salts of disubstituted dithiocarbamic acids effective in the practice of this invention are illustrated by the following:

Zinc diisoamyl dithiocarbamate
Zinc octadecyl dithiocarbamate
Zinc phenyl ethyl dithiocarbamate
Zinc diethyl dithiocarbamate
Zinc dibutyl dithiocarbamate
Zinc dimethyl dithiocarbamate
Zinc dibenzyl dithiocarbamate
Zinc n-ethyl-n phenyl dithiocarbamate
Copper dimethyl dithiocarbamate
Copper diethyl dithiocarbamate
Selenium diethyl dithiocarbamate
Tellurium dimethyl dithiocarbamate
Cadmium dibutyl dithiocarbamate
Calcium dimethyl dithiocarbamate
Sodium diethyl dithiocarbamate
Sodium dioctyl dithiocarbamate
Lead dimethyl dithiocarbamate
Strontium dimethyl dithiocarbamate
Nickel dibutyl dithiocarbamate
Nickel dimethyl dithiocarbamate
Tin dibutyl dithiocarbamate
Antimony dibutyl dithiocarbamate
Bismuth dimethyl dithiocarbamate Some of the metal salts are somewhat highly colored themselves and for this reason may introduce slight changes in color in the synthetic rubber-modified polystyrene, particularly if used in large amounts. For instance, technical grades of selenium diethyl dithiocarbamates have an orange-yellow color, whereas the dimethyl salt has a yellow color. Copper dimethyl dithiocarbamate of technical grade has a dark reddish brown color and tellurium diethyl dithiocarbamate has a yellow-orange color.

The preferred dithiocarbamate salts are those containing as the metal ion, zinc, cadmium or lead, since the salts of these metals are in most instances of a light color or at least of a neutral color, such as gray. This class of dithiocarbamate salts are particularly desirable in synthetic rubber-modified polystyrene containing white or pastel color pigments.

The presence of both types of stabilizers are required in the modified composition, since the presence of either type alone has been found ineffective to stabilize against color degradation due to exposure to heat and oxygen. This requirement is demonstrated by the data accompanying the subsequent examples.

The amount of each type of stabilizer required to produce an effective color stabilizing effect can be as little as 0.25% on the weight of the synthetic rubber-modified polystyrene for each stabilizer. Amounts more than 5% of each type of stabilizer on the modified polystyrene do not appear necessary from the experimental data thus far noted to obtain maximum stabilizing effect and may on the other hand, with the more highly colored stabilizer types introduce objectionable coloring effects.

The incorporation of the aforedescribed stabilizers in the synthetic rubber-modified polystyrenes is preferably done before the modified polystyrene has been subjected to any considerable degree of heat. The stabilizers can be added to the rubber-modified polystyrene by conventional compounding such as mixing in a Banbury, screw extruder-compounders and heated mixing rolls. In the instance of synthetic rubber-modified polystyrenes produced by blending polystyrene emulsions and synthetic rubber latices, or by emulsion polymerizing styrene monomer in admixture with the synthetic rubber latice, it has been found desirable to incorporate at least the hydroquinone monoether to protect the modified polystyrene against oxidative effects while being heated to remove water and to protect the dried material against oxidation in storage.

The following examples further illustrate the practice of the invention:

Example 1

A synthetic rubber-modified polystyrene was prepared by mixing together at room temperature 25 parts of GR–S type latex of 60% solids (containing a synthetic rubber copolymer comprising 30% styrene and 70% butadiene) and 212.5 parts of polystyrene emulsion (40.0% solids), the polystyrene having an average molecular weight of 80,000 as calculated by the Staudinger formula. There were then added to the mixture 0.50 part by weight of hydroquinone monobenzyl ether in the form of an aqueous dispersion per 100 parts solids of the rubber-polystyrene blend. The blend was then dried on a double drum drier with drums at a temperature of approximately 155° C. A white-pigmented molding composition was prepared by mixing on heated rolls at 155° C. until a uniform mix was obtained, the following composition:

| | Parts by weight |
|---|---|
| Butadiene rubber-polystyrene blend | 100 |
| Mineral oil | 2 |
| Zinc oxide | 2 |
| Titanium dioxide | 6 |
| Ultramarine blue | 0.0395 |
| Oil violet special Z, a dye | 0.001 |
| Zinc diethyl dithiocarbamate | 0.5 |

The resultant composition was examined for color stability by exposing strips of the composition removed from the heated rolls in an oven containing an air atmosphere at a constant temperature of 175° C. At the end of 1 hour oven treatment, the sample strips still retained their white color. Continuing the oven treatment for another hour at the same temperature resulted in the strips changing to a light cream color. In contrast to these results, a duplicate sample of the same white-pigmented composition containing only the hydroquinone monobenzyl ether, and no dithiocarbamate salt developed a pronounced cream color after a one-hour oven treatment at 175° C.

Example 2

The same pigmented composition described in Example 1, except that 0.5 part by weight of hydroquinone monobenzyl ether and 0.5 part of zinc dimethyl dithiocarbamate were used as the stabilizers, resulted in a stabilized composition that maintained its white color after a one-hour exposure at 175° C. in an oxygen atmosphere. Continuing the oven treatment for another hour at the same temperature resulted in the sample specimens changing to a light cream color.

Example 3

A synthetic rubber-modified polystyrene was prepared by mixing together at room temperature 50 parts of GR–S type butadiene-styrene copolymer latex of 60% solids and 175 parts of polystyrene emulsion (40% solids), the polystyrene having an average molecular weight of 80,000 as calculated by the Staudinger formula. There were then added to the mixture 0.5 part by weight of hydroquinone monobenzyl ether in the form of an aqueous dispersion per 100 parts of solids of the rubber-polystyrene blend. The mixture was then drum-dried and compounded with the same pigments and zinc diethyl dithiocarbamate stabilizer as described in Example 1. Specimens tested in an air atmosphere at 175° C. for one hour retained their white color. After a two-hours' exposure under the same conditions the specimens changed to a light tan color.

Example 4

A synthetic rubber-modified polystyrene was prepared by mixing a GR–S latex (a copolymer of 70% butadiene and 30% styrene) of 60% solids with an emulsion of styrene and catalyst and reacting to form a modified polystyrene containing about 30% by weight of the original butadiene-styrene rubbery copolymer. There was then added to 100 parts of solids of the reacted product 0.5 part by weight of hydroquinone monobenzyl ether and 0.5 part by weight of zinc diethyl dithiocarbamate, both in the form of aqueous dispersions. The stabilized latex was then drum dried on a double drum drier at a temperature of approximately 155° C. The same white-pigmented molding composition as described in Example 1 (except the dithiocarbamate salt was omitted at this point) was then prepared with the drum dried resin by mixing on a heated two-roll mill at 155° C. until a uniform mix was obtained. This yielded a stabilized product which maintained its white color for over two hours at 175° C. in an oxygen containing atmosphere.

The stabilized compositions of this invention can be satisfactorily compression molded at 150° C.–175° C. and injection molded at material temperatures between about 190° C. and 280° C. and in the time cycles normally required for this type of material without developing a noticeable or objectionable color change. Extrusion temperatures in the range between 180° C. and 220° C. cause no objectionable change in color. Furthermore, the so stabilized synthetic rubber-modified polystyrene compositions can be compounded in the Banbury, two-roll mills and other heated mixing equipment without discoloration, whereas the same composition containing no stabilizers will severely discolor under these conditions and are likely to oxidize on storage at room temperature.

What is claimed is:

1. Moldable composition resistant to heat and oxygen comprising polystyrene modified with a minor amount of a butadiene synthetic rubber, said modified polystyrene containing stabilizing amounts of a hydroquinone monoether having the formula

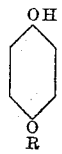

in which R is a monovalent hydrocarbon group free from olefinic unsaturation and selected from the group consisting of alkyl, aryl, alkaryl and aralkyl and of a metal salt of a disubstituted dithiocarbamic acid, said salt having the formula

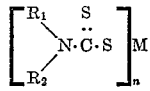

in which $R_1$ and $R_2$ are each a monovalent hydrocarbon group free from olefinic unsaturation, M is a metal and $n$ is an integer corresponding to the principal valence of the metal, M.

2. Moldable composition according to claim 1, in which the metal of the dithiocarbamate salt is zinc.

3. Moldable composition according to claim 1 in which the metal of the dithiocarbamate salt is cadmium.

4. Moldable composition according to claim 1 in which the metal of the dithiocarbamate salt is lead.

5. Moldable composition according to claim 1, in which the hydroquinone monoether stabilizer is hydroquinone monobenzyl ether.

6. Moldable composition according to claim 1 in which the metal of the dithiocarbamate salt is selected from the group consisting of antimony, bismuth, cadmium, copper, lead, nickel, selenium, sodium, strontium, tellurium, tin and zinc and in which the monovalent hydrocarbon group is selected from the group consisting of alkyl, aryl and benzyl.

7. Moldable composition resistant to heat and oxygen comprising polystyrene modified with a minor amount of butadiene synthetic rubber, said modified polystyrene containing stabilizing amounts of a hydroquinone monoether having the formula

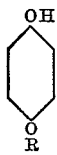

in which R is a monovalent hydrocarbon group free from olefinic unsaturation and selected from the group consisting of alkyl, aryl, alkaryl and aralkyl and of a metal salt of a disubstituted dithiocarbamic acid, said salt having the formula

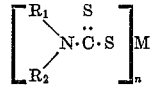

in which $R_1$ and $R_2$ are each a monovalent hydrocarbon group free from olefinic unsaturation, M is a metal and $n$ is an integer corresponding to the principal valence of the metal, M, the amounts of said hydroquinone monoether and of said metal salt being each between 0.25 percent and 5 percent by weight of said modified polystyrene composition.

8. Moldable composition according to claim 1, in which the hydroquinone monoether is hydroquinone monobenzyl ether and in which the metal of the dithiocarbamate salt is zinc, said monoether and said salt each constituting between 0.25 percent and 5 percent by weight of said modified polystyrene composition.

References Cited in the file of this patent
UNITED STATES PATENTS

| | | |
|---|---|---|
| 2,133,297 | Jones | Oct. 18, 1938 |
| 2,540,996 | Ryden | Feb. 6, 1951 |
| 2,628,952 | Sanders et al. | Feb. 17, 1953 |